(12) United States Patent  
Shemtov

(10) Patent No.: US 10,879,681 B2  
(45) Date of Patent: Dec. 29, 2020

(54) COUPLING FOR ELECTRICAL METALLIC TUBING

(71) Applicant: Atkore Steel Components, Inc., Coconut Creek, FL (US)

(72) Inventor: Sami Shemtov, Hollywood, FL (US)

(73) Assignee: Atkore Steel Components, Inc., Coconut Creek, FL (US)

( * ) Notice: Subject to any disclaimer, the term of this patent is extended or adjusted under 35 U.S.C. 154(b) by 408 days.

(21) Appl. No.: 15/879,574

(22) Filed: Jan. 25, 2018

(65) Prior Publication Data

US 2019/0229508 A1 Jul. 25, 2019

(51) Int. Cl.
*H02G 3/06* (2006.01)
*F16L 3/10* (2006.01)

(52) U.S. Cl.
CPC .......... *H02G 3/0683* (2013.01); *F16L 3/1033* (2013.01); *H02G 3/06* (2013.01); *Y10T 29/49* (2015.01)

(58) Field of Classification Search
CPC ...... H02G 3/0683; H02G 3/06; H02G 3/0691; F16L 3/1016; F16L 3/1033; F16L 3/1211; F16L 21/08; F16L 21/06; F16L 21/065; F16L 33/02; F16L 33/04; F16L 33/06; F16L 33/021; F16L 33/023; F16L 55/1705; F16L 55/172
USPC ...................... 285/149.1, 154.1, 154.3, 154.4
See application file for complete search history.

(56) References Cited

U.S. PATENT DOCUMENTS

| | | | |
|---|---|---|---|
| 1,221,425 A | | 4/1917 | Dremel |
| 1,525,014 A | | 2/1925 | Volk, Jr. |
| 3,829,136 A | * | 8/1974 | Eidelberg ................. H02G 3/06 |
| 5,137,305 A | | 8/1992 | Straub |
| 5,165,735 A | * | 11/1992 | Nardi |
| D380,197 S | * | 6/1997 | Garcia ................. H02G 3/0691 |
| 5,647,613 A | * | 7/1997 | Marik .................. H02G 3/0691 |
| | | | 285/154.3 |
| 6,106,031 A | | 8/2000 | Guginsky |
| 6,276,865 B1 | | 8/2001 | Korzan et al. |

(Continued)

FOREIGN PATENT DOCUMENTS

| CN | 202811711 U | 3/2013 |
|---|---|---|
| CN | 205908577 U | 1/2017 |
| CN | 206682092 U | 11/2017 |

(Continued)

*Primary Examiner* — Zachary T Dragicevich
(74) *Attorney, Agent, or Firm* — Kacvinsky Daisak Bluni PLLC

(57) ABSTRACT

A coupling may include a main body having a first circumferential end and a second circumferential end. The coupling may further include a first tab extending from the first circumferential end and a second tab extending from the second circumferential end, the first tab including a first opening to receive a fastener and the second tab including a second opening to receive the fastener. The coupling may further include a central tab extending from the first circumferential end, the central tab received within a central tab opening of the second circumferential end. In some embodiments, an electrical metallic tubing (EMT) may extend within a central cavity defined by a tubular shape of the main body. The coupling may further include a set screw extending through the first and second tabs for engagement with the EMT.

20 Claims, 6 Drawing Sheets

(56) References Cited

U.S. PATENT DOCUMENTS 7,410,192 B2 * 8/2008 Ignaczak ............... F16L 21/065
2005/0264012 A1 12/2005 Ignaczak et al.

FOREIGN PATENT DOCUMENTS

| GB | 143886 A | 3/1921 |
| GB | 2413605 A | 11/2005 |
| JP | H04249605 A | 9/1992 |
| JP | H0579589 A | 3/1993 |

* cited by examiner

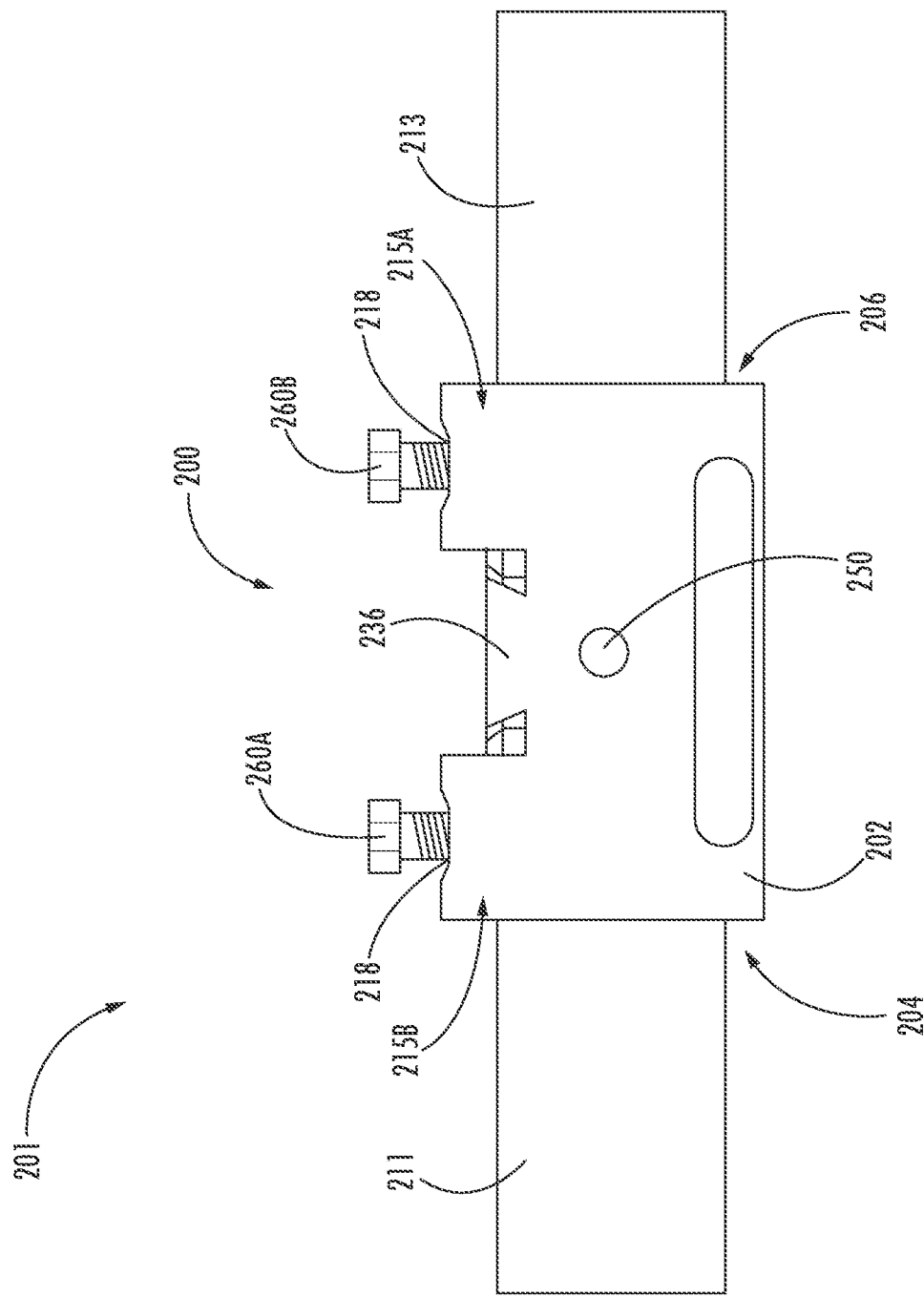

COUPLING FOR ELECTRICAL METALLIC TUBING

FIELD OF THE DISCLOSURE

The disclosure relates generally to conduit coupling assemblies and, more particularly, to a conduit coupling assembly suitable for use with electrical metallic tubing.

BACKGROUND OF THE DISCLOSURE

Current approaches for connecting electrical metallic tubing (EMT) include either a set screw coupling or a compression coupling. Set screw EMT couplings are sleeves, which slip over the outside diameter of two opposing EMTs. Set screw EMT couplings typically have an inner ridge to ensure that the two pieces of EMT butt up properly to the center of the coupling. The coupling has set screw(s) that penetrate the wall of the coupling and, when tightened, create both a ground path and a secure fit.

Some set screw couplings may include a threaded end or other type of attaching mechanism to enable attachment of the EMT with an enclosure, such as a junction box or some other piece of equipment that has an opening for the connector. Couplings can be held in place with locknuts that lock the connector into place and provide a continued ground path.

Existing EMT couplings are typically made from 10-20 ft. lengths of tubing having unique inside/outside diameters. The process includes initially rolling a flat sheet into a desired diameter tube, which is then cut to length for each individual EMT coupling. A chamfer may then be made on both ends of the coupling, and a groove is rolled into the tubing to provide a center stop for the EMTs. Set screw holes may then be extruded from the EMT coupling. The entire process is labor intensive and costly. It is with respect to these and other deficiencies of current EMT coupling and current EMT coupling formation processes that the present disclosure is provided.

SUMMARY

An exemplary coupling in accordance with the present disclosure may include a main body having a first circumferential end and a second circumferential end, and a first tab extending from the first circumferential end and a second tab extending from the second circumferential end. The first tab may include a first opening to receive a fastener, and the second tab may include a second opening to receive the fastener. The coupling may further include a central tab extending from the first circumferential end, the central tab received within a central tab opening of the second circumferential end.

An exemplary method for forming a coupling assembly according to embodiments of the disclosure includes forming a main body from a sheet of material, the main body having a first circumferential end, a second circumferential end, a first axial end, and a second axial end. The method may further include forming a first tab extending from the first circumferential end and forming a second tab extending from the second circumferential end. The method may further include forming a first opening in the first tab to receive a fastener, and forming a second opening in the second tab to receive the fastener. The method may further include forming a central tab extending from the first circumferential end, the central tab operable to be received within a central tab opening formed in the second circumferential end.

An electrical metallic tubing (EMT) coupling assembly according to embodiments of the disclosure includes a main body formed into a tubular shape, the main body having a first axial end opposite a second axial end, and a first circumferential end aligned with a second circumferential end. The EMT coupling assembly may further include a first pair of tabs extending from the first circumferential end and a second pair of tabs extending from the second circumferential end. The first pair of tabs each include a first opening, and the second pair of tabs each include a second opening. The EMT coupling assembly may further include a central tab extending from the first circumferential end, the central tab received within a central tab opening of the second circumferential end.

BRIEF DESCRIPTION OF THE DRAWINGS

The accompanying drawings illustrate exemplary approaches of the disclosed embodiments so far devised for the practical application of the principles thereof.

FIG. 7 is a side view of the EMT coupling assembly of FIG. 5 in accordance with embodiments of the present disclosure.

Figure 1:
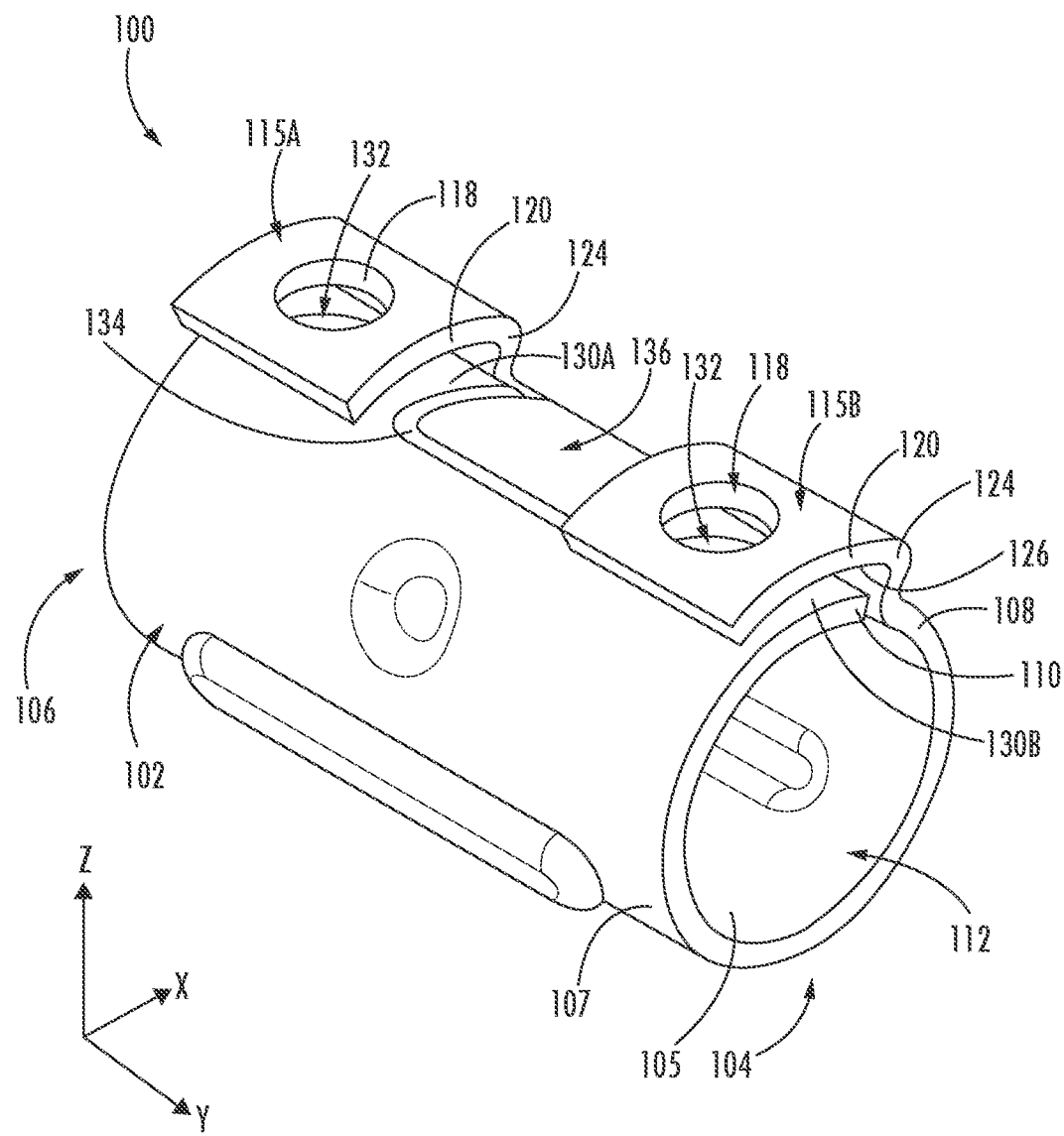
FIG. 1 is a first perspective view of a coupling after formation in accordance with embodiments of the present disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

Multi-purpose conduit assemblies/fittings/couplings suitable for use with EMT in accordance with the present disclosure will now be described more fully hereinafter with reference to the accompanying drawings, where embodiments of the conduit assemblies/fittings/couplings are shown. The assemblies/fittings/couplings may be embodied in many different forms and are not be construed as being limited to the embodiments set forth herein. Instead, these embodiments are provided so this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts. The terminology will include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

A coupling for electrical metallic tubing (EMT), and methods for forming the coupling, are provided. In some embodiments, the coupling may include a main body having a first circumferential end and a second circumferential end. The coupling may further include a first tab extending from the first circumferential end and a second tab extending from the second circumferential end. The first tab may include a first opening to receive a fastener, and the second tab may include a second opening to also receive the fastener. The coupling may further include a central tab extending from the first circumferential end, the central tab being received within a central tab opening of the second circumferential end. In some embodiments, an electrical metallic tubing (EMT) may extend within a central cavity defined by a tubular shape of the main body. The coupling may further include a set screw extending through the first and second tabs for engagement with the EMT.

Figure 2:
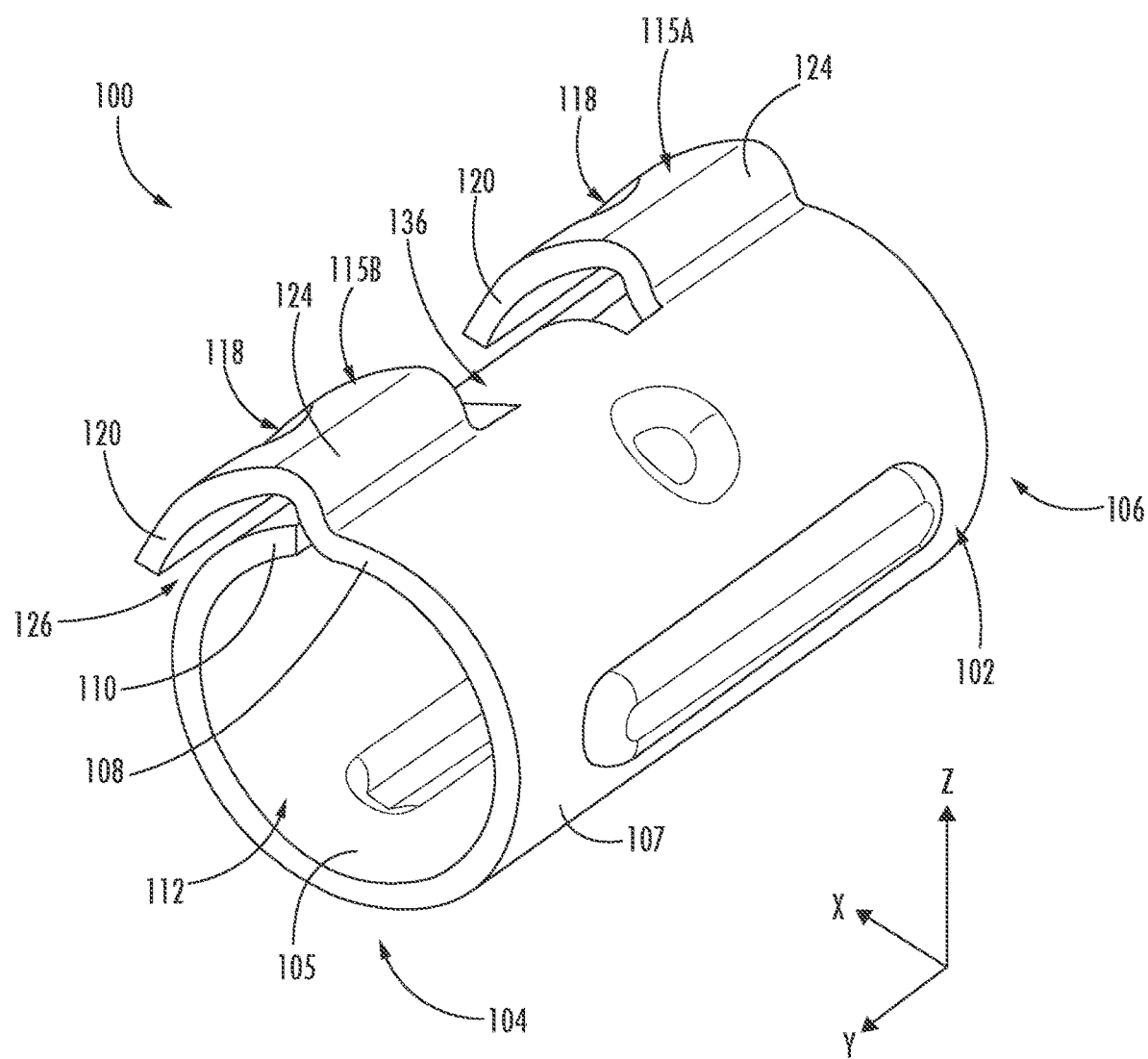
FIG. 2 is a second perspective view of the coupling of FIG. 1 in accordance with embodiments of the present disclosure.

Referring now to FIGS. 1-4, a coupling 100 for joining together two lengths of EMT according to embodiments of the present disclosure will be described in greater detail. As shown, the coupling 100 may include a main body 102 having a first axial end 104 opposite a second axial end 106, and a first circumferential end 108 opposite a second circumferential end 110. The main body 102 may be a thin layer of material, such as steel, which is initially provided as a flat sheet having a first side 105 opposite a second side 107. The various features of the main body 102 may be stamped, and the main body 102 is then formed into a tubular shape, as will be described in greater detail below. When configured as a tube, the first circumferential end 108 of the main body 102 is directly adjacent and aligned with the second circumferential end 110. For the sake of description hereinafter, axial designations may refer to directions or lengths extending along the y-axis, and radial designations may refer to directions or lengths extending radially outward (e.g., along the x-axis and the z-axis) from a central axis extending through a central cavity 112 defined by the first side 105 of the main body 102 when configured as a tube, such as shown in FIGS. 1-2.

Figure 4:
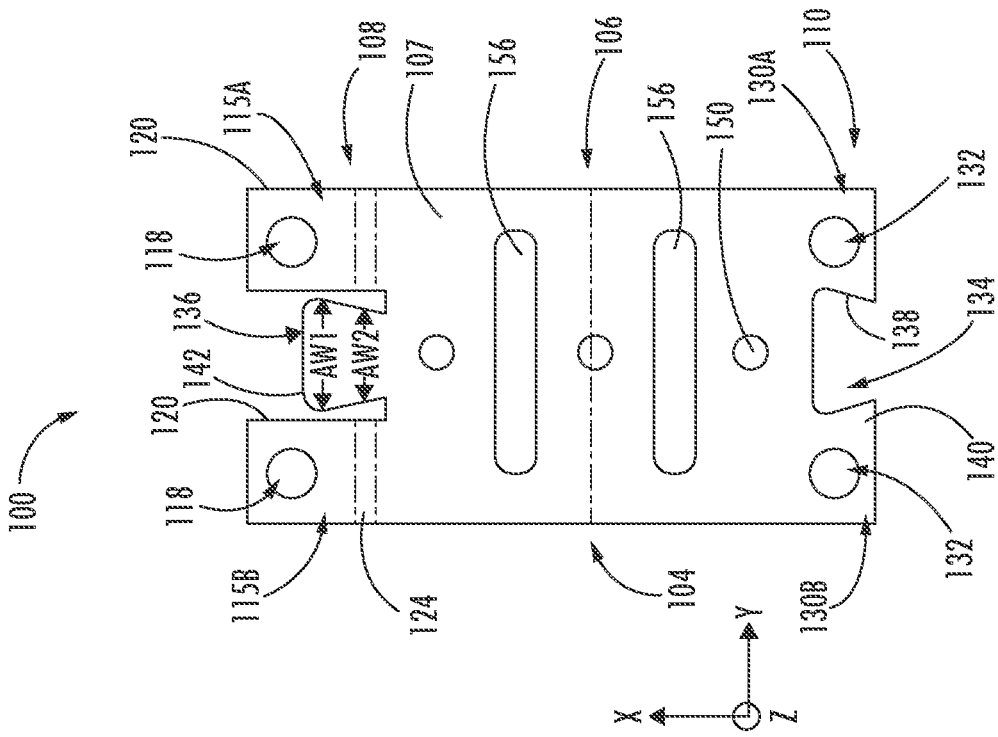
FIG. 4 is a top view of the coupling of FIG. 1 prior to rolling in accordance with embodiments of the present disclosure.
Figure 3:
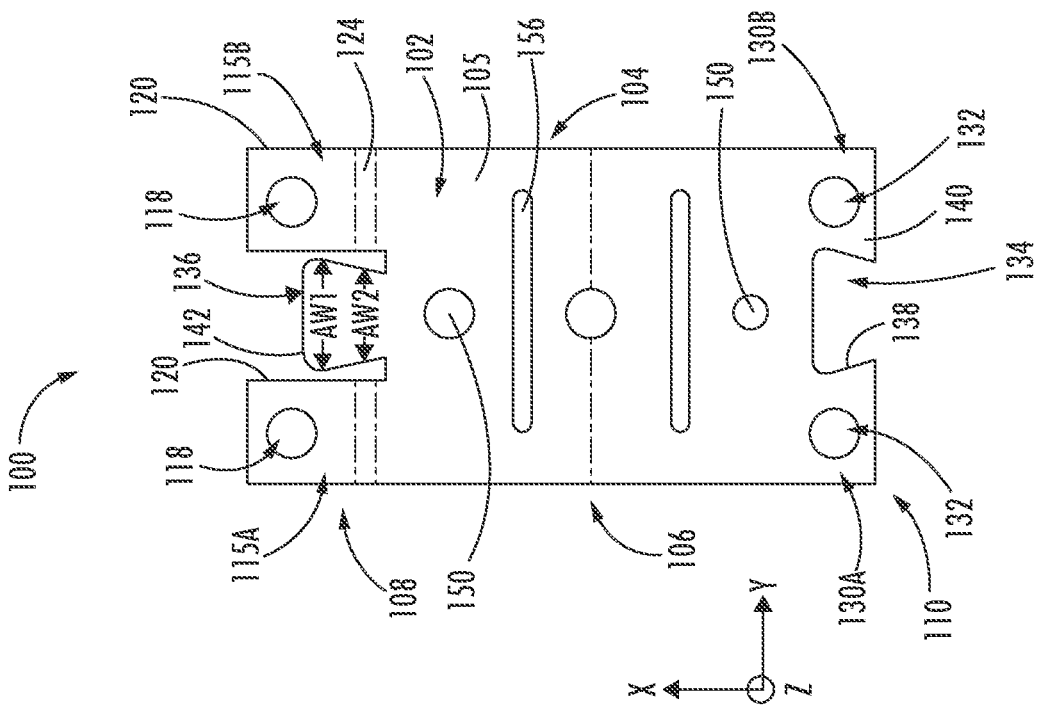
FIG. 3 is a bottom view of the coupling of FIG. 1 prior to rolling in accordance with embodiments of the present disclosure.
Figure 6:
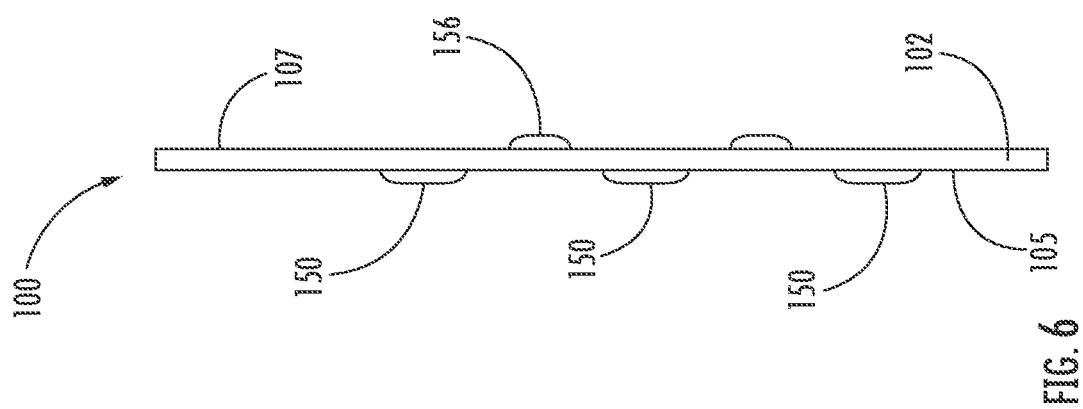
FIG. 6 is an end view of the coupling of FIG. 1 prior to rolling in accordance with embodiments of the present disclosure.

The coupling 100 may include a first pair of tabs 115A and 115B extending from the first circumferential end 108. In an initial flat/planar configuration of the main body 102, as shown in FIGS. 3-4, the first pair of tabs 115A-B may extend along a same plane (e.g., x-y plane) as the main body 102. The first pair of tabs 115A-B may each include a first opening 118 for receiving a fastener (e.g., a set screw) therein. Although not limited to any particular shape or geometry, each of the first pair of tabs 115A-B may generally be rectangular shaped having parallel extending side edges 120. As further shown, the first pair of tabs 115A-B may each be integrally connected with the first circumferential end 108 by shoulder regions 124 extending radially away from the main body 102 when the main body 102 is formed as a tube. The shoulder regions 124 permit a gap 126 to be provided between the first pair of tabs 115A-B and the main body 102. The gap 126 may allow small amounts of movement between the first pair of tabs 115A-B and the second circumferential end 110 of the main body 102 to accommodate, for example, EMT of different diameters.

The coupling 100 may further include a second pair of tabs 130A and 130B extending from the second circumferential end 110. In the initial flat/planar configuration of the main body 102, the second pair of tabs 130A-B may extend along a same plane (e.g., x-y plane) as the main body 102. The second pair of tabs 130A-B may each include a second opening 132 to receive a fastener (e.g., a set screw) therein. When the main body 102 is in a tubular configuration, the first pair of tabs 115A-B may overlap the second pair of tabs 130A-B in a circumferential direction, such that the first openings 118 of the first pair of tabs 115A-B are aligned over the second openings 132 of the second pair of tabs 130A-B.

The second pair of tabs 130A-B may further define a central tab opening 134, which is configured to receive a central tab 136 extending from the first circumferential end 108. Although not limited to any particular shape or geometry, in some embodiments, each of the second pair of tabs 130A-B may include an angled sidewall 138 and a corner 140 (FIGS. 3-4) operable to engage and retain the central tab 136 within the central tab opening 134. As shown, the corners 140 extend towards one another on opposite sides of the central tab opening 134 to create a narrowed opening.

In some embodiments, as best shown in FIGS. 3-4, the central tab 136 may include a free end 142 having a first axial width 'AW1'. The central tab 136 may further include a fixed end 144 having a second axial width 'AW2'. In some embodiments, AW1 is greater/longer than AW2, which compliments the geometry of the central tab opening 134. As a result, the free end 142 is operable to engage the angled sidewall 138 and/or the corners 140 of the second set of tabs 130A-B, and thus prevent the central tab 136 from being removed from the central tab opening 134, for example, in the event the main body 102 expands. In other words, the central tab 136 and the central tab opening 134 secure the first circumferential end 108 to the second circumferential end 110 along with a set of fasteners (not shown) formed through the first pair of tabs 115A-B and the second pair of tabs 130A-B.

Turning now to FIGS. 3-6, the coupling 100 according to embodiments of the present disclosure will be described in greater detail. As shown, the coupling 100 may include one or more tube stops 150 extending from the first side 105 and into the central cavity 112 of the main body 102. The tube stops 150 may abut an end of a length of EMT 155 (FIG. 5), thus preventing the EMT 155 from axially moving further into the central cavity 112. In some embodiments, the tube stops 150 are positioned at an approximate center of the main body 102 so that two lengths of EMT extend the same distance within the main body 102. Embodiments herein are not limited to any particular location of the tube stops 150, however. As further shown, the coupling 100 may include one or more stiffening ridges 156 extending axially along the main body 102, outwardly from the second side 107 thereof. In some embodiments, the tube stops 150 and the stiffening ridges 156 may be formed by a die stamping/pressing process.

Figure 5:
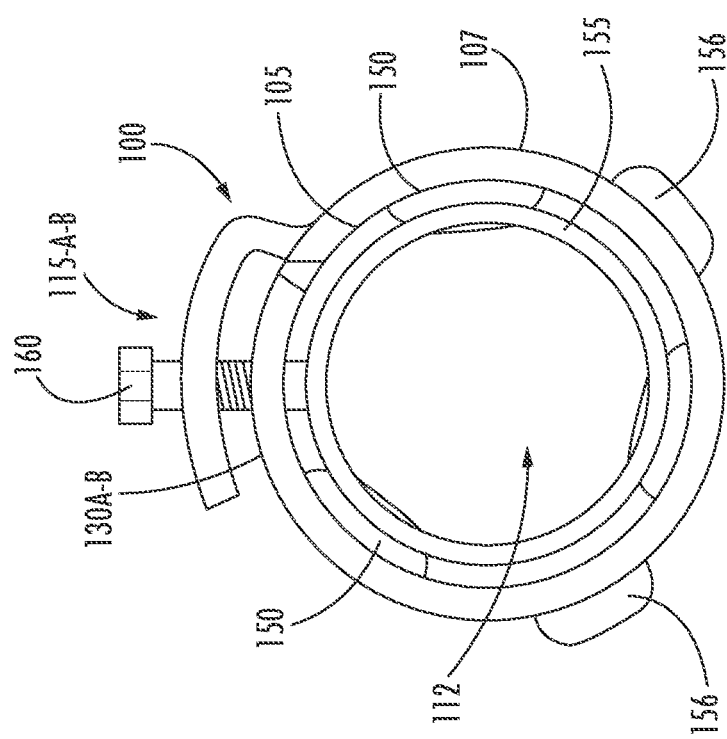
FIG. 5 is an end view of an EMT coupling assembly in accordance with embodiments of the present disclosure.

As further shown in FIG. 5, the coupling 100 may include one or more set screws 160 extending through each of the first pair of tabs 115A-B and the second pair of tabs 130A-B. The set screw 160 may be rotated to engage the EMT 155, thus further retaining the EMT 155 within the central cavity 112 of the main body 102. To remove the EMT 155, the set screw 160 may be rotated in an opposite direction to disengage from the EMT 155.

Referring now to FIG. 7, an EMT coupling assembly 201 in accordance with embodiments of the present disclosure is shown. The coupling assembly 201 may include a coupling 200, which may the same or similar to the coupling 100 described above. That is, the coupling 200 includes many or all of the features previously described in relation to coupling 100 of FIGS. 1-6 and, as such, will not be described in detail for the sake of brevity.

As shown, the coupling 200 may include a tubular main body 202 having a first axial end 204 opposite a second axial end 206. Extending from the first axial end 204 is a first EMT 211, and extending from the second axial end 206 is a second EMT 213. The first EMT 211 may be held in place by a first fastener 260A (e.g., a set screw), while the second EMT 213 may be held in place by a second fastener 260B (e.g., a second set screw). The first and second EMTs 211 and 213 may abut opposite sides of one or more tube stops 250 formed in the main body 202.

The coupling 200 may include a first pair of tabs 215A and 215B extending from the first circumferential end of the main body 202. The coupling 200 may further include a second pair of tabs (not shown) extending from the second circumferential end. The first pair of tabs 215A-B each include a first opening 218 to receive the first fastener 260A and the second fastener 260B, respectively. The central tab 236 is operable to extend from the first circumferential end of the main body 202. During use, the first fastener 260A and the second fastener 260B extend through the first and second pairs of tabs for engagement with the first EMT 211 and the second EMT 213, respectively. The first fastener 260A and the second fastener 260B also couple together the first pair of tabs 215A-B with the second pair of tabs.

Figure 8:
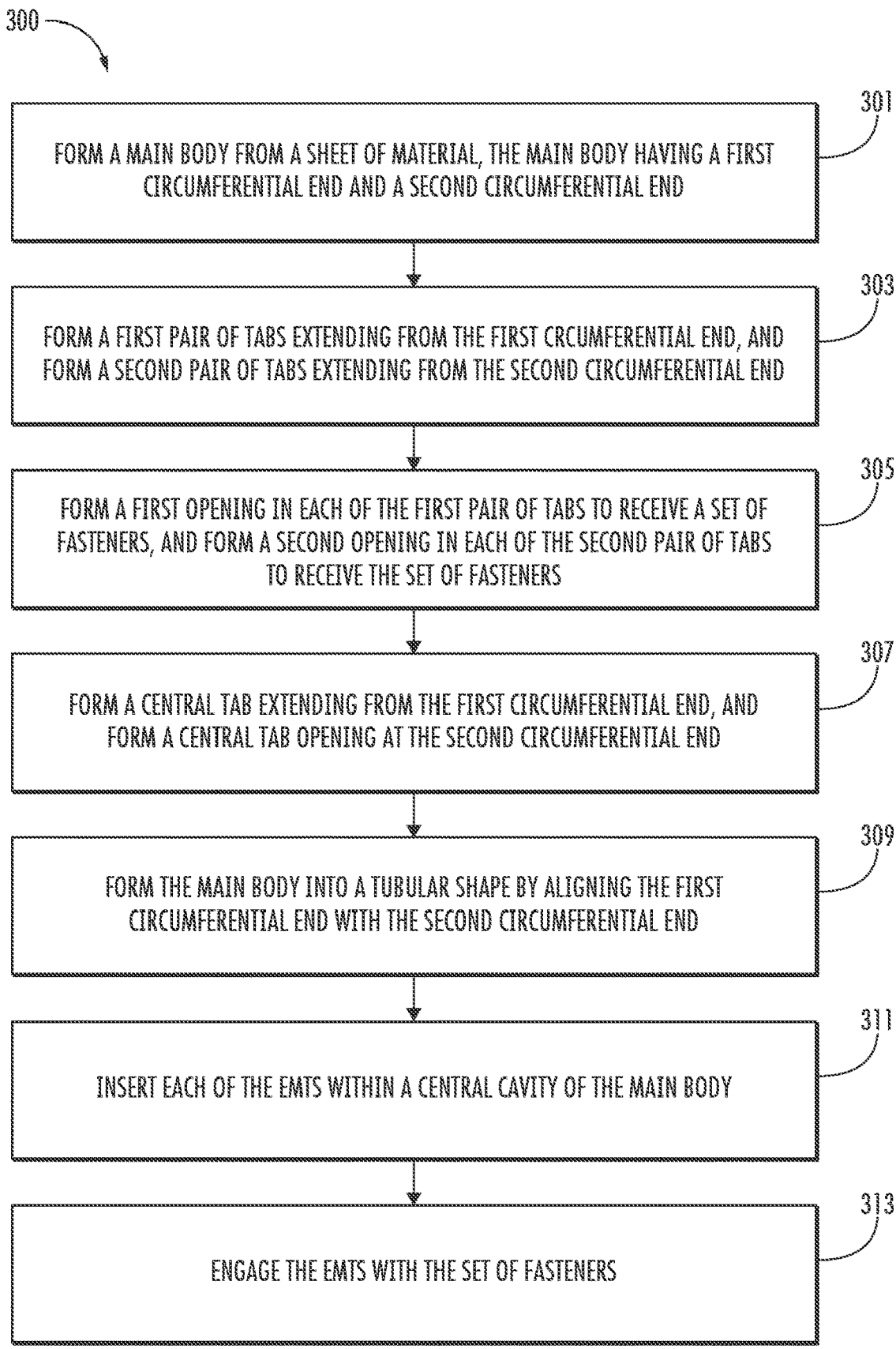
FIG. 8 is a block diagram of a method for forming the EMT coupling assembly of FIGS. 5 and 7 in accordance with embodiments of the present disclosure.

Turning now to FIG. 8, a method 300 for forming a coupling assembly according to embodiments of the present disclosure will be described in greater detail. At block 301, the method 300 may include forming a main body from a sheet of material, the main body having a first circumferential end and a second circumferential end. The main body is also formed to include a first axial end opposite a second axial end. In some embodiments, the sheet of material is a metal, such as steel or aluminum. In some embodiments, forming the main body includes forming at least one stiffening ridge axially along the main body, and forming at least one tube stop.

At block 303, the method may include forming a first pair of tabs extending from the first circumferential end, and forming a second pair of tabs extending from the second circumferential end. In some embodiments, each of the first pair of tabs may generally be rectangular shaped and having parallel extending side edges. The first pair of tabs may each be integrally connected with the first circumferential end by shoulder regions. The second pair of tabs may be integrally coupled with, and extend along a same plane as, the second circumferential end.

At block 305, the method 300 may include forming openings in each of the first pair of tabs and the second pair of tabs. In some embodiments, the openings are configured to receive a fastener (e.g., threaded set screw) therein.

At block 307, the method 300 may include forming a central tab extending from the first circumferential end, and forming a central tab opening at the second circumferential end. In some embodiments, the central tab is configured and operable to be received within the central tab opening.

At block 309, the method 300 may include forming the main body into a tubular shape by aligning the first circumferential end with the second circumferential end. In some embodiments, the central tab may be inserted within the central tab opening upon alignment of the first and second circumferential ends. More specifically, a free end of the central tab may be inserted or placed within the central tab opening, wherein the central tab opening includes an angled sidewall operable to engage the free end of the central tab to prevent separation of the first and second circumferential ends. In some embodiments, the first pair of tabs may extend over/past the second pair of tabs such that the openings of the first pair of tabs are aligned over the openings of the second pair of tabs. By aligning the tab openings, the set screws may engage each respective EMT and couple together the first and second circumferential ends of the main body.

At block 311, the method 300 may include inserting each of the EMTs within the central cavity of the main body. In some embodiments, the EMTs may engage one or more tube stops formed along an interior surface of the main body. The tube stops prevent further axial movement of the EMTs within the main body.

At block 313, the method 300 may include engaging each EMT with the first fastener and the second fastener, respectively, wherein the fasteners extend through the first pair of tabs and the second pair of tabs. In some embodiments, the first and second fasteners are set screws extending in a radial direction from the main body.

Although the illustrative method 300 is described above as a series of acts or events, the present disclosure is not limited by the illustrated ordering of such acts or events unless specifically stated. Some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 300 may be implemented in association with the formation and/or processing of structures illustrated and described herein as well as in association with other structures not illustrated.

In some embodiments, one or more of blocks 301, 303, 305, 307, and 309 may be performed using a die stamping or die pressing process. For example, coupling 100 and coupling 200 described above may be formed by placing flat sheet metal in either blank or coil form into a stamping press where a tool and die surface forms the metal into a net shape. Stamping includes a variety of sheet-metal forming manufacturing processes, such as punching using a machine press or stamping press, blanking, embossing, bending, flanging, and coining. This could be a single stage operation where every stroke of the press produces the desired form on coupling, or could occur through a series of stages. The process is usually carried out on sheet metal, but can also be used on other materials, such as polystyrene. In some embodiments, stamping may be done on cold metal sheet.

Embodiments described herein offer at least the following advantages. Unlike prior approaches in which a flat metal sheet is rolled into a desired diameter tube and then cut to length to begin forming the coupling, the coupling of the present disclosure can be formed in fewer process steps, e.g., by rolling the tube after the elements of the coupling have been formed. For example, after using a progressive stamp die to form the tabs, the openings, the tube stops, and the stiffening ridges, the main body may then be rolled into a tube shape such as by bringing the first and second circumferential ends together.

While the present disclosure has been described with reference to certain approaches, numerous modifications, alterations and changes to the described approaches are possible without departing from the spirit and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

The invention claimed is:

1. A coupling, comprising:
   a main body having a first circumferential end and a second circumferential end;
   a first tab extending from the first circumferential end and a second tab extending from the second circumferential end, the first tab including a first opening to receive a fastener, and the second tab including a second opening to receive the fastener, wherein the fastener extends into a central cavity of the main body for engagement with an electrical metallic tubing (EMT); and
   a central tab extending from the first circumferential end, the central tab received within a central tab opening of the second circumferential end.

2. The coupling of claim 1, wherein the first tab extends over the second tab.

3. The coupling of claim 1, wherein the first opening is aligned over the second opening.

4. The coupling of claim 1, the central tab comprising:
   a free end having a first axial width; and
   a fixed end integrally formed with the first circumferential end, the fixed end having a second axial width, wherein the second axial width is less than the first axial width.

5. The coupling of claim 4, wherein the central tab opening includes an angled sidewall operable to engage the free end of the central tab.

6. The coupling of claim 1, further comprising at least one stiffening ridge extending axially along the main body.

7. The coupling of claim 1, further comprising a plurality of tube stops extending into a central cavity of the main body.

8. The coupling of claim 7, wherein the main body has a tubular shape defining the central cavity.

9. The coupling of claim 8, further comprising a third tab extending from the first circumferential end and a fourth tab extending from the second circumferential end, wherein the central tab extends between the first tab and the third tab.

10. The coupling of claim 9, wherein the first tab is integrally connected with the first circumferential end by a first shoulder region, wherein the third tab is integrally connected with the first circumferential end by a second shoulder region, and wherein the first and second shoulder regions extend radially away from the central cavity.

11. A method of forming a coupling assembly, comprising:
   forming a main body from a sheet of material, the main body having a first circumferential end, a second circumferential end, a first axial end, and a second axial end;
   forming a first tab extending from the first circumferential end and forming a second tab extending from the second circumferential end;
   forming a central tab extending from the first circumferential end, the central tab operable to be received within a central tab opening formed in the second circumferential end;
   forming a first opening in the first tab;
   and forming a second opening in the second tab; and
   providing a fastener through the first opening and the second opening, wherein the fastener extends into a central cavity of the main body for engagement with an electrical metallic tubing (EMT).

12. The method of claim 11, further comprising aligning the first circumferential end with the second circumferential end to form the main body into a tubular shape.

13. The method of claim 12, further comprising forming at least one stiffening ridge axially along the main body, and forming at least one tube stop extending into the central cavity defined by the main body.

14. The method of claim 11, further comprising engaging the EMT with the fastener extending through the first and second tabs.

15. The method of claim 11, further comprising extending the first tab over the second tab in a circumferential direction such that the first opening is aligned over the second opening.

16. The method of claim 11, further comprising inserting a free end of the central tab within the central tab opening, wherein the central tab opening includes an angled sidewall operable to engage the free end of the central tab.

17. An electrical metallic tubing (EMT) coupling assembly, comprising:
   a main body having a tubular shape, the main body including a first axial end opposite a second axial end, and a first circumferential end aligned with a second circumferential end;
   a first pair of tabs extending from the first circumferential end and a second pair of tabs extending from the second circumferential end, wherein the first pair of tabs each include a first opening, and wherein the second pair of tabs each include a second opening;
   a central tab extending from the first circumferential end, the central tab disposed within a central tab opening of the second circumferential end; and
   an electrical metallic tubing (EMT) extending within the main body, wherein at least one fastener extends through the first and second pairs of tabs and into a central cavity of the main body for engagement with the EMT.

18. The EMT coupling assembly of claim 17, wherein the first pair of tabs extends over the second pair of tabs in a circumferential direction such that the first openings are aligned over the second openings.

19. The EMT coupling assembly of claim 17, the central tab comprising:
   a free end having a first axial width; and
   a fixed end extending from the first circumferential end, the fixed end having a second axial width, wherein the second axial width is less than the first axial width, and wherein the central tab opening includes an angled sidewall operable to engage the free end of the central tab to retain the central tab within the central tab opening.

20. The EMT coupling assembly of claim 17, wherein each of the first pair of tabs is integrally connected with the first circumferential end by a shoulder region extending radially away from the main body.

\* \* \* \* \*